(12) United States Patent
Tachibana

(10) Patent No.: US 6,192,678 B1
(45) Date of Patent: Feb. 27, 2001

(54) SECONDARY AIR SUPPLY CONTROL SYSTEM FOR INTERNAL COMBUSTION ENGINE

(75) Inventor: Yosuke Tachibana, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/482,007

(22) Filed: Jan. 13, 2000

(30) Foreign Application Priority Data

Feb. 22, 1999 (JP) .................................................. 11-043825

(51) Int. Cl.$^7$ ........................................................ F01N 3/00
(52) U.S. Cl. ................................................ 60/289; 60/307
(58) Field of Search ............................. 60/289, 304, 307, 60/284

(56) References Cited

U.S. PATENT DOCUMENTS

| | | | |
|---|---|---|---|
| 4,271,667 | * 6/1981 | Mitsuda et al. | 60/289 |
| 4,747,386 | * 5/1988 | Onishi | 123/491 |
| 5,379,586 | * 1/1995 | Honji et al. | 60/289 |
| 5,385,017 | * 1/1995 | Harada | 60/284 |
| 5,493,858 | * 2/1996 | Hosoya et al. | 60/289 |
| 5,584,177 | * 12/1996 | Oketani et al. | 60/289 |
| 5,727,384 | * 3/1998 | Ma | 60/284 |
| 5,845,486 | * 12/1998 | Yamashita et al. | 60/284 |
| 5,881,552 | * 3/1999 | Iwata et al. | 60/284 |

* cited by examiner

Primary Examiner—Thomas Denion
Assistant Examiner—Tu M. Nguyen
(74) Attorney, Agent, or Firm—Arent Fox Kintner Plotkin & Kahn, PLLC

(57) ABSTRACT

A secondary air supply control system controls supply of air to a catalyst arranged in the exhaust passage of an internal combustion, for purification of exhaust gases. A temperature difference between a temperature of an engine coolant sensed at a stoppage of the engine and stored and a temperature of the engine coolant sensed at a start of the engine after the stoppage is calculated. It is determined whether or not a stop time period between the stoppage and the start of the engine is short, depending on the temperature difference. When it is determined that the stop time period is short, an operation time period over which the air pump is to be operated to supply air to the catalyst is corrected based on a temperature difference between a temperature of the engine coolant sensed at the start of the engine and a temperature of intake air sensed at the start of the engine.

8 Claims, 8 Drawing Sheets

SECONDARY AIR SUPPLY CONTROL SYSTEM FOR INTERNAL COMBUSTION ENGINE

BACKGROUND OF THE INVENTION

1. Field of the Invention

This invention relates to a secondary air supply control system for an internal combustion engine, which controls the supply of secondary air to an upstream side of a catalyst arranged in an exhaust pipe of the engine to activate the catalyst, thereby enhancing exhaust emission characteristics.

2. Description of the Prior Art

In general, a catalyst, such as a three-way catalyst, arranged in an exhaust pipe of an internal combustion engine is not active enough for purification of exhaust gases until it is heated up to a predetermined temperature. To cope with this inconvenience, some conventional internal combustion engines are provided with a secondary air supply control system for supplying secondary air to the upstream side of the catalyst at the start of the engine by operating an electromagnetic valve and an electric air pump to burn unburned combustible components in exhaust gases, such as CO and HC, thereby activating (warming up) the catalyst. A secondary air supply control system of this kind was proposed e.g. by Japanese Laid-Open Patent Publication (Kokai) No. 6-129241. In this secondary air supply control system, an engine coolant temperature THWST at the start of the engine is sensed by an engine coolant temperature sensor, then a supply time period CDANKIX is calculated based on the sensed engine coolant temperature THWST, and secondary air is supplied to the upstream side of the catalyst over the calculated supply time period CDANKIX to thereby control activation of the catalyst. That is, the secondary air supply control system uses the engine coolant temperature THWST sensed at the start of the engine as a parameter reflecting a temperature of the catalyst at the start of the engine to determine the supply time period CDANKIX over which secondary air is to be supplied. More specifically, as the engine coolant temperature THWST is lower, the supply time period CDANKIX is set to have a larger value.

However, since the above secondary air supply control system uses the engine coolant temperature THWST as the parameter reflecting the catalyst temperature, secondary air can be supplied excessively or insufficiently. This results from the fact that the engine coolant temperature THWST sensed when the engine is restarted cannot always reflect the catalyst temperature accurately because the catalyst temperature at the restart of the engine depends on an operating condition of the engine before stoppage, a stop time period between the stoppage and the restart of the engine, and so forth, even if the engine coolant temperature THWST is identical. The excessive supply of secondary air can cause overheating of the catalyst and generate untoward noises. In addition, an excessively long operation time period over which the electromagnetic valve and the electric air pump are operated for supplying the secondary not only shortens the service life of the electromagnetic valve and that of the electric air pump but also degrade fuel economy and fast consumption of a battery. On the other hand, the insufficient supply of secondary air causes degradation of exhaust emission characteristics due to insufficient activation of the catalyst.

SUMMARY OF THE INVENTION

It is an object of the invention to provide a secondary air supply control system for an internal combustion engine, which is capable of supplying an appropriate amount of secondary air to a catalyst of the engine to thereby activate the catalyst properly.

To attain the above object, the present invention provides a secondary air supply control system for an internal combustion engine including an exhaust passage, and a catalyst arranged in the exhaust passage, for purification of exhaust gases, the secondary air supply control system controlling supply of air to the catalyst, and comprising:

air supply means for supplying air to the catalyst;

engine coolant temperature-sensing means for sensing a temperature of an engine coolant within the engine;

intake air temperature-sensing means for sensing a temperature of intake air within the engine;

operation time-determining means for determining an operation time period over which the air supply means is to be operated;

storage means for storing a value of the temperature of the engine coolant sensed by the engine coolant temperature-sensing means at a stoppage of the engine;

arithmetic operation means for calculating a temperature difference between the value of the temperature of the engine coolant sensed at the stoppage of the engine and stored in the storage means and a value of the temperature of the engine coolant sensed at a start of the engine after the stoppage of the engine;

determination means for determining whether or not a stop time period between the stoppage of the engine and the start of the engine is short, depending on the temperature difference calculated by the arithmetic operation means; and operation time-correcting means for correcting the operation time period, based on a temperature difference between the value of the temperature of the engine coolant sensed at the start of the engine and a value of the temperature of the intake air sensed at the start of the engine, when the determination means determines that the stop time period is short.

According to the secondary air supply control system of the invention, it is determined whether or not the stop time period of the engine is short, depending on the temperature difference between a value of the engine coolant temperature sensed at the stoppage of the engine and a value of coolant temperature sensed at the start of the engine. In this case, the temperature of the engine coolant which circulates within a cooling system of the engine tends to fall continuously after the engine is stopped, so that it is possible to determine accurately from the temperature difference whether the stop time period of the engine is long or short. If the stop time period is short, the operation time period over which the air supply means is to be operated is corrected based on the temperature difference between the value of the engine coolant temperature and a value of the intake air temperature both sensed at the start of the engine. In general, when the stop time period of the engine is short, the temperature of the engine coolant continues falling as described above, but the temperature of the intake air, which has been held close to a temperature of fresh air continuously taken in before the stoppage of the engine, tends to rise temporarily with a temporary rise in temperature of the whole intake pipe caused by heat remaining in the engine after the stoppage thereof, since the fresh air ceases to be taken in. Therefore, the temperature difference between the value of the engine coolant temperature and the value of the intake air temperature both sensed at the start of the engine accurately reflects the stop time period of the engine and hence a decrease in temperature of the catalyst due to the stoppage of the engine. Thus, differently from the prior art in which a time period for supplying secondary air is determined simply based on the engine coolant temperature sensed at the start of the internal combustion engine, the present embodiment makes it possible to supply an appropriate amount of secondary air to the catalyst according to the decrease in temperature of the catalyst by correcting, based on the temperature difference, the operation time period over which the air supply means is to be operated, thereby activating the catalyst properly. Further, it is possible to obtain the above effects without sensing the catalyst temperature directly, so that a sensor for sensing the catalyst temperature can be dispensed with, which prevents an increase in manufacturing costs.

Preferably, the secondary air supply control system further comprises:

remaining time storage means for storing therein a remaining time period of the operation time period at the stoppage of the engine;

comparison means for performing a comparison between the operation time period determined at the start of the engine and the remaining time period stored in the remaining time storage means; and selection means for selecting, based on a result of the comparison performed by the comparison means, a longer one of the operation time period determined at the start of the engine and the remaining time period, as the operation time period at the start of the engine over which the air supply means is to be operated.

According to this preferred embodiment, the remaining time period of the operation time period is stored in the remaining time storage means at the stoppage of the engine, and at the start of the engine after the stoppage of the same, the longer one of the operation time period determined at the start of the engine and the remaining time period is selected, so as to supply secondary air to the catalyst. This makes it possible to prevent insufficient supply of secondary air which might occur if the air supply means is operated over the operation time period determined at the start of the engine after the stoppage of the same, and thereby activate the catalyst positively and sufficiently.

Preferably, the operation time-correcting means corrects the operation time period such that as the temperature difference between the value of the temperature of the engine coolant sensed at the start of the engine and the value of the temperature of the intake air sensed at the start of the engine is larger, the operation time period becomes shorter.

Preferably, the determination means determines that the stop time period between the stoppage of the engine and the start of the engine is short, when the temperature difference calculated by the arithmetic operation means is not larger than a predetermined value.

Preferably, the operation time-determining means determines the operation time period based on the value of the temperature of the engine coolant sensed at the start of the engine.

The above and other objects, features, and advantages of the invention will become apparent from the following detailed description taken in conjunction with the accompanying drawings.

DETAILED DESCRIPTION

The invention will now be described in detail with reference to the drawings showing an embodiment thereof.

Figure 1:
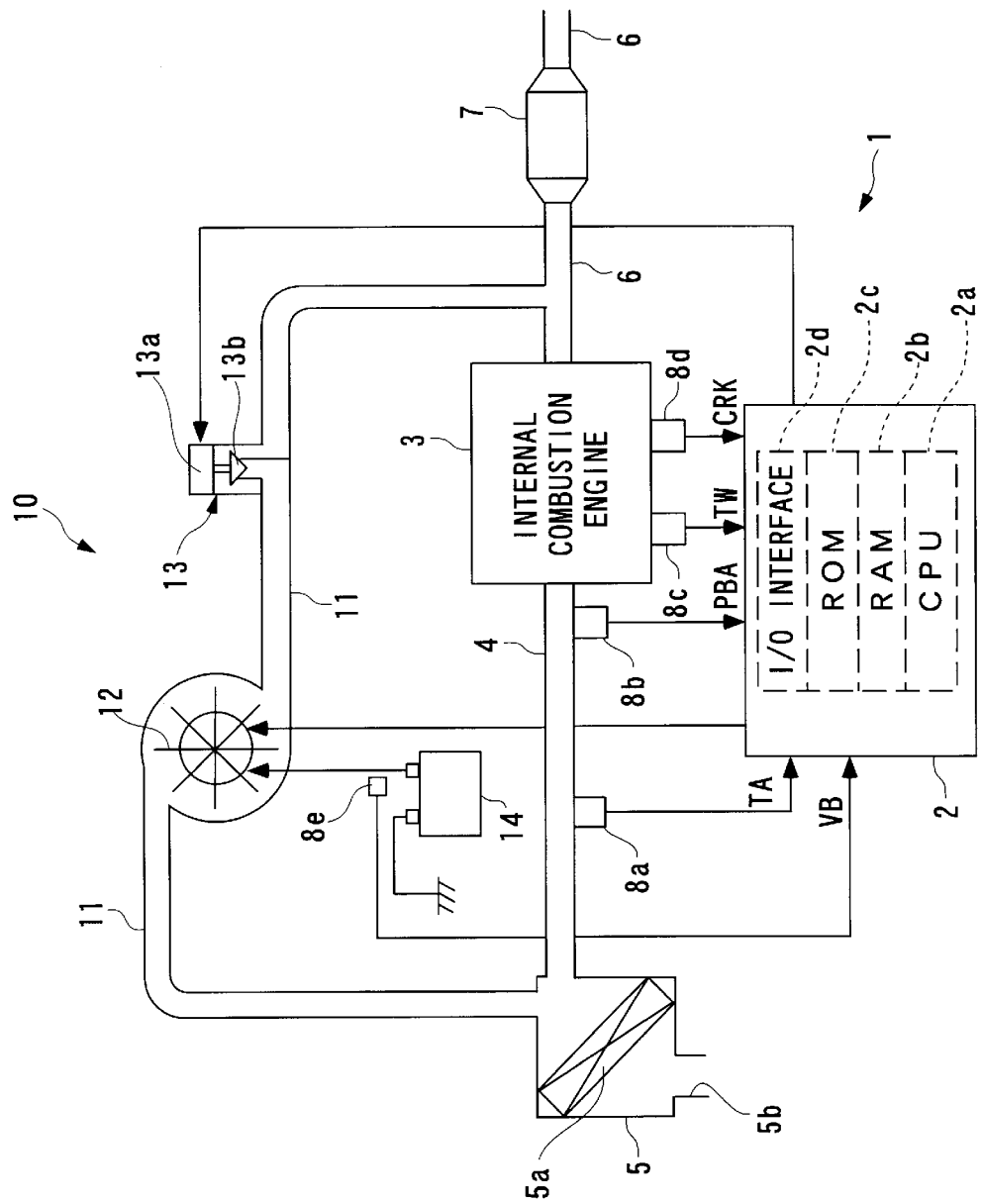
FIG. 1 is a view schematically showing the whole arrangement of a secondary air supply control system for an internal combustion engine, according to an embodiment of the invention.

Referring first to FIG. 1, there is schematically shown the whole arrangement of a secondary air supply control system (hereinafter simply referred to as "the control system") 1 for an internal combustion engine, according to an embodiment of the invention. As shown in the figure, the control system 1 includes an ECU (operation time-determining means, arithmetic operation means, determination means, operation time-correcting means, selection means, and comparison means) 2. As described in detail hereinafter, the ECU 2 controls operation of a secondary air supply system 10 as air supply means, according to operating conditions of the internal combustion engine (hereinafter simply referred to as "the engine") 3.

Connected to the engine 3 is an intake pipe 4 which has an upstream end thereof connected to an air cleaner 5 having a filter 5a arranged therein. Air drawn into the air cleaner 5 via an air inlet port 5b thereof during operation of the engine is supplied to the engine 3 as intake air through the intake pipe 4 after having dust and dirt removed therefrom by the filter 5a. An intake air temperature sensor (intake air temperature-sensing means) 8a formed of a thermistor or the like and an intake pipe absolute pressure sensor 8b formed of a semiconductor pressure sensor or the like are inserted into respective intermediate portions of the intake pipe 4. The intake air temperature sensor 8a senses an intake air temperature TA which is a temperature of intake air within the intake pipe 4 and supplies an electric signal indicative of the sensed intake air temperature TA to the ECU 2, while the intake pipe absolute pressure sensor 8b senses an absolute pressure PBA within the intake pipe 4 and supplies an electric signal indicative of the sensed absolute pressure PBA to the ECU 2. Further, connected to the engine 3 is an exhaust pipe (exhaust passage) 6 having a catalyst (e.g. three-way catalyst) 7 arranged in an intermediate portion thereof for purifying exhaust gases.

An engine coolant temperature sensor (engine coolant temperature-sensing means) 8c formed of a thermistor or the like is mounted in the cylinder block of the engine 3. The engine coolant temperature sensor 8c senses an engine coolant temperature TW which is a temperature of an engine coolant circulating within the cylinder block of the engine 3 and supplies an electric signal indicative of the sensed engine coolant temperature TW to the ECU 2. Further, the engine 3 is provided with a crank angle position sensor 8d formed of a magnet rotor and MRE (magnetoresistance element) pickup for sensing the rotational angle of a crankshaft, not shown, of the engine 3 and generates CRK signal pulses in accordance with rotation of the crankshaft. The CRK signal is indicative of the sensed rotational angle of the crankshaft and each pulse thereof is generated whenever the crankshaft rotates through a predetermined angle and supplied to the ECU 2. The ECU 2 determines rotational speed of the engine 3 (engine rotational speed) NE, based on the CRK signal.

The secondary air supply system 10 is comprised of a secondary air supply pipe 11 connecting between the air cleaner 5 and the exhaust pipe 6, an air pump (air supply means) 12 arranged in an intermediate portion of the secondary air supply pipe 11, and an electromagnetic valve 13 arranged in the secondary air supply pipe 11 at a location downstream of the air pump 12. The secondary air supply pipe 11 has an upstream end thereof connected to the air cleaner 5 and a downstream end thereof connected to the exhaust pipe 6 at a location upstream of the catalyst 7. The air pump 12 is an electric air pump provided with a motor, not shown. When power is supplied to the air pump 12 from a battery 14 in response to a drive signal from the ECU 2 (i.e. when the air pump 12 is energized), the air pump 12 starts operation for forcibly supplying air from the air cleaner 5 through the secondary air supply pipe 11 to the downstream side as secondary air. The battery 14 is provided with a voltage sensor 8e which senses a voltage value VB of the battery 14 and delivers a signal indicative of the sensed voltage value VB to the ECU 2.

The electromagnetic valve 13 which is a combination of a solenoid 13a and a diaphragm valve element 13b opens and closes the secondary air supply pipe 11 in response to a drive signal from the ECU 2. At a location downstream of the valve element 13b of the electromagnetic valve 13, there is arranged a reed valve, not shown, which normally holds the secondary air supply pipe 11 in a closed state. When the electromagnetic valve 13 is opened, the reed valve is opened through operation of the air pump 12 or a negative pressure produced by pulsation of exhaust gases within the exhaust pipe 6.

The ECU 2 is formed by a microcomputer including a CPU 2a, a RAM (storage means, remaining time storage means) 2b, a ROM 2c, and an I/O interface 2d. The RAM 2b is supplied with power by a backup power source such that stored data can be preserved even when the engine 3 is in stoppage. Detection signals from the sensor 8a to 8e are each delivered to the I/O interface 2d for A/D conversion and waveform shaping, and then inputted into the CPU 2a. The CPU 2a makes a judgement on an operating condition of the engine 3 based on these signals. Further, as described in detail hereinafter, the CPU 2a determines, by running a control program stored in advance in the ROM 2c and using data stored in the RAM 2b, etc., whether or not the air pump 12 and the electromagnetic valve 13 are to be operated, and delivers drive signals dependent on the determinations to the air pump 12 and the electromagnetic valve 13, respectively, thereby controlling the secondary air supply system 10.

Figure 2:
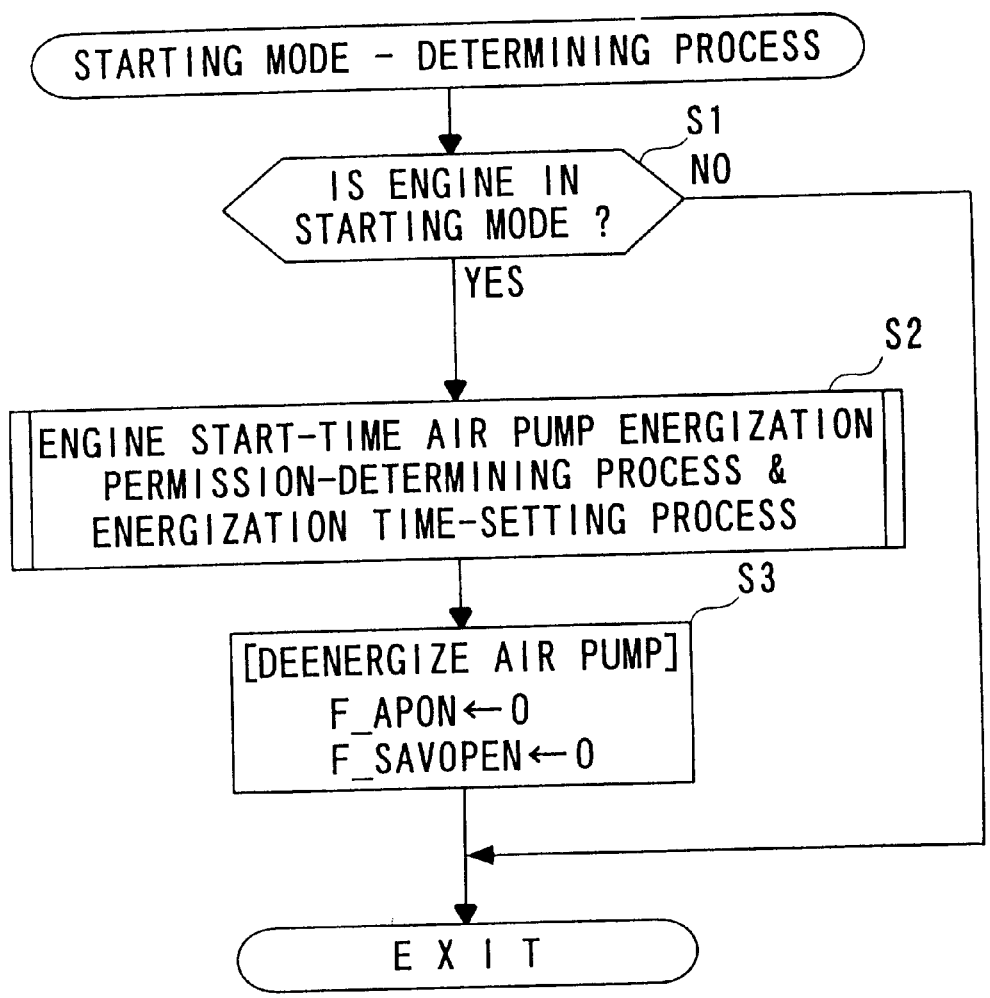
FIG. 2 is a flowchart showing a routine for carrying out a starting mode-determining process, which is executed by the secondary air supply control system.
Figure 4:
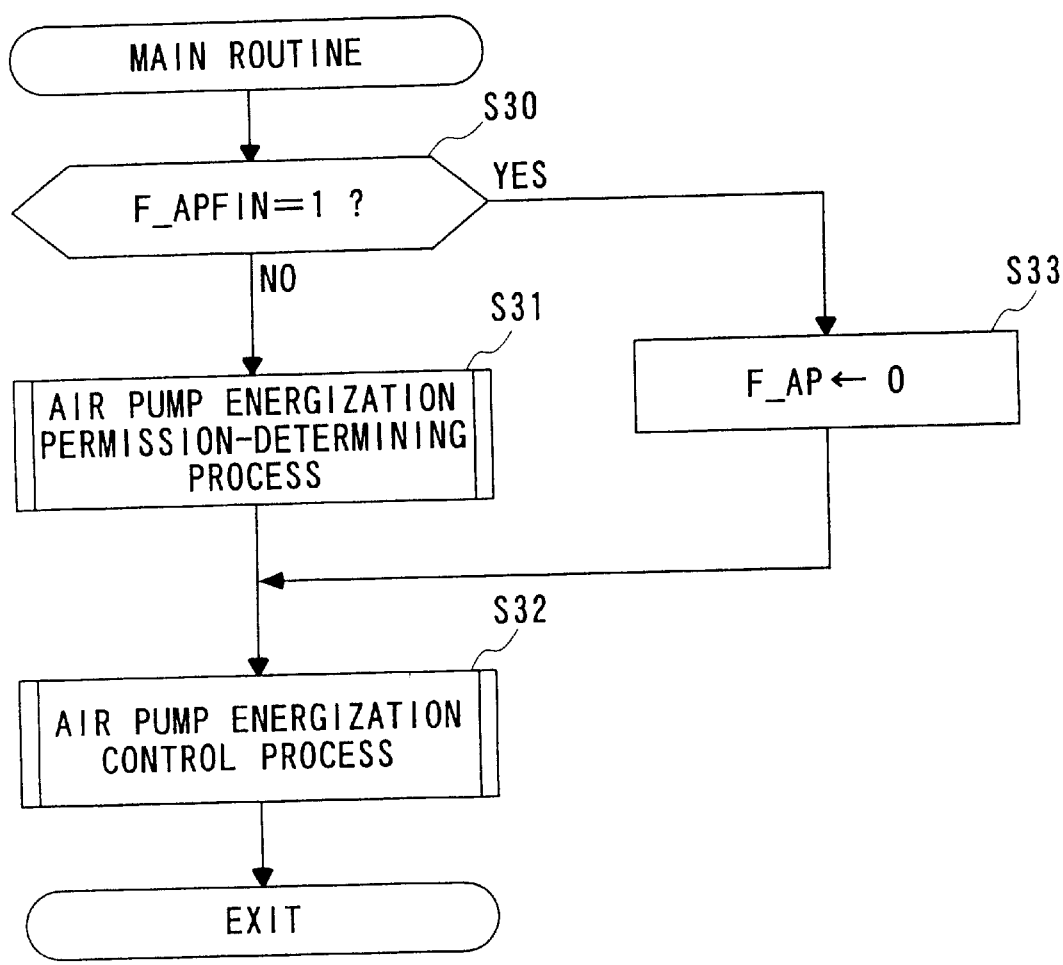
FIG. 4 is a flowchart showing a main routine for carrying out a control process in a basic mode of the engine, which is executed by the secondary air supply control system.

Next, a process for controlling the secondary air supply system 10, which is carried out by the ECU 2 during operation of the engine 3, will be described. FIG. 2 shows a routine for carrying out a starting mode-determining process, while FIG. 4 shows a main routine for controlling the secondary air supply system 10 when the engine 3 is in a basic mode. These programs are alternately carried out at predetermined time intervals of e.g. 100 msec.

First, the starting mode-determining process will be described. In this process, it is determined at a step S1 whether or not the engine 3 is in the starting mode. This determination is carried out based on the engine rotational speed NE determined from the CRK signal generated by the crank angle position sensor 8d. More specifically, if the engine rotational speed NE is lower than a predetermined engine rotational speed (e.g. 500 rpm), it is determined that the engine 3 is in the starting mode, whereas if the engine rotational speed NE is equal to or higher than the predetermined engine rotational speed, it is determined that the engine 3 is in the basic mode.

If the answer to the question of the step S1 is negative (No), i.e. if the engine 3 is in the basic mode, the program is immediately terminated. On the other hand, if the answer is affirmative (Yes), i.e. if the engine 3 is in the starting mode, the program proceeds to a step S2, wherein an engine start-time air pump energization permission-determining process and an energization time-setting process are carried out. These processes will be described in detail hereinafter. Then, the program proceeds to a step S3, wherein an energization flag F_APON and a valve opening/closing flag F_SAVOPEN are each reset to "0", followed by terminating the program. The energization flag F_APON is a flag indicative of a state (to be energized or deenergized) of the air pump 12, which is set to "1" when the air pump 12 is to be energized and reset to "0" when the same is to be deenergized. The valve opening/closing flag F_SAVOPEN is a flag indicative of a state (to be opened or closed) of the electromagnetic valve 13, which is set to "1" when the electromagnetic valve 13 is to be opened and reset to "0" when the same is to be closed. Therefore, the step S3 shows that when the engine 3 is in the starting mode, the air pump 12 is set to be deenergized and stopped, and the electromagnetic valve 13 is set to be closed.

Figure 3:
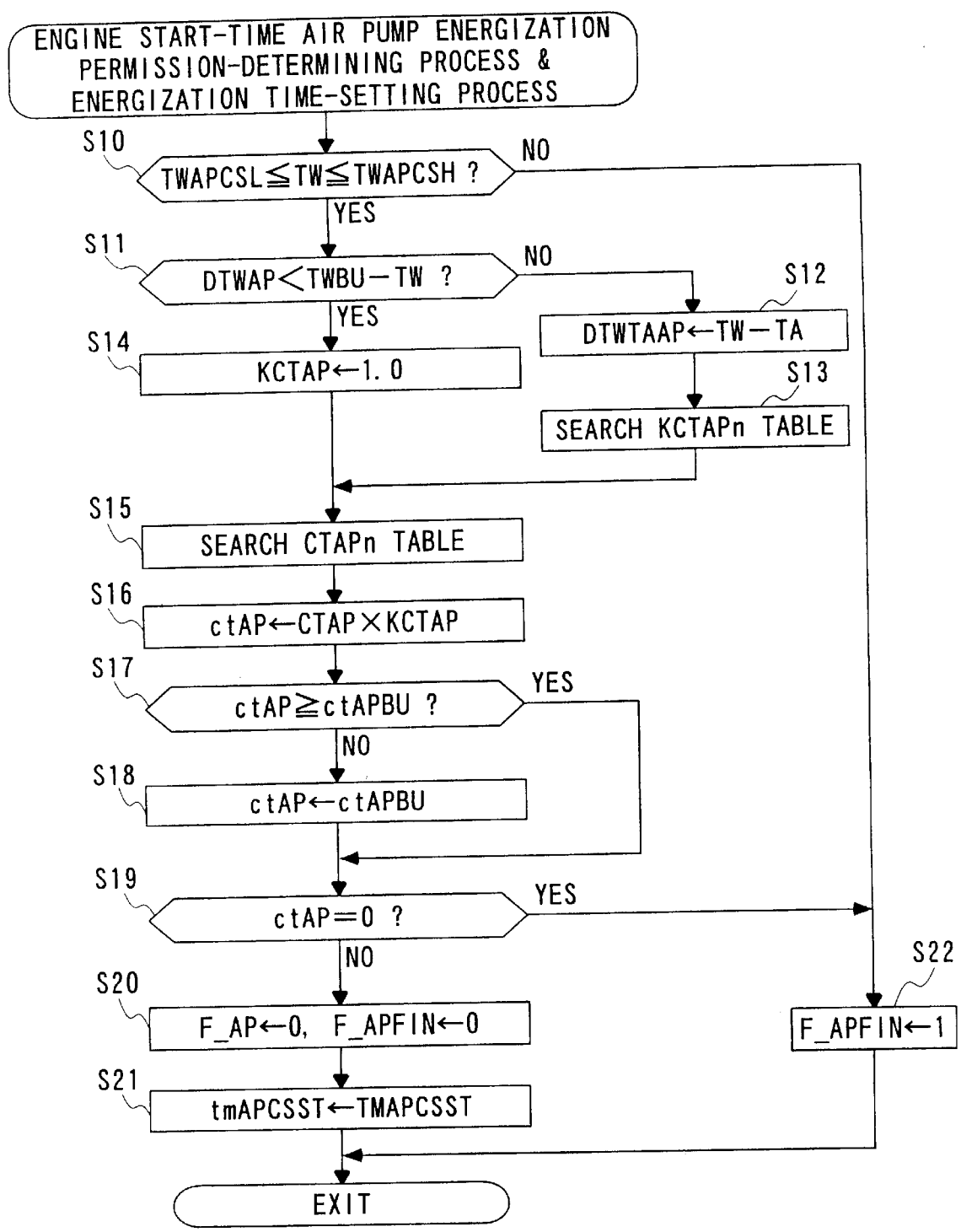
FIG. 3 is a flowchart showing a subroutine for carrying out an engine start-time air pump energization permission-determining process and an energization time-setting process, which are executed at a step S2 in FIG. 2.

Next, a subroutine executed at the step S2 of FIG. 2, for carrying out the engine start-time air pump energization permission-determining process and the energization time-setting process, will be described with reference to FIG. 3. In this subroutine, first, it is determined at a step S10 whether or not the engine coolant temperature TW is equal to or higher than a lower limit value TWAPCSL and equal to or lower than an upper limit value TWAPCSH (TWAPCSL≦TW≦TWAPCSH). The lower limit value TWAPCSL is set at a sufficiently low temperature (e.g. 0° C.) such that when the engine coolant temperature TW is below the temperature, a rise in temperature of the catalyst 7 cannot be expected even if the air pump 12 is operated to supply secondary air to the catalyst 7 and freezing of condensed water within the secondary air supply pipe 11 is likely to occur to hinder normal opening operation of the electromagnetic valve 13. On the other hand, the upper limit value TWAPCSH is set at a sufficiently high temperature (e.g. 70° C.) such that when the engine coolant temperature TW exceeds the temperature, the catalyst 7 is expected to have been sufficiently activated.

If the answer to the question of the step S10 is affirmative (Yes), i.e. the engine coolant temperature TW is within the above range, the program proceeds to a step S11, wherein it is determined whether or not a temperature difference between an engine coolant temperature TWBU stored in the RAM 2b when the engine 3 was stopped last time and the engine coolant temperature TW sensed when the engine 3 is started this time is larger than a predetermined value DTWAP (DTWAP<TWBU−TW). The predetermined value DTWAP is a reference value (e.g. 20° C.) with reference to which is determined whether or not a stop time period between the immediately preceding stoppage of the engine 3 and the current start of the same is short.

Figure 7:
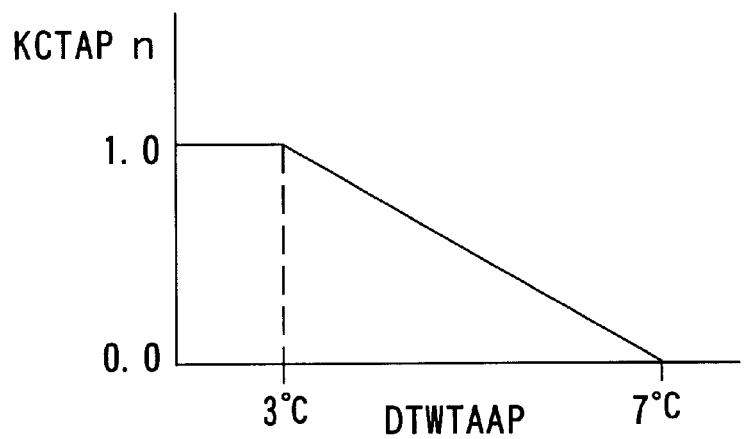
FIG. 7 is a KCTAPn table showing the relationship between a temperature difference DTWTAAP and an energization time correction coefficient KCTAP.

If the answer to the question of the step S11 is negative (No), i.e. if DTWAP≧TWBU−TW holds, it is determined that the stop time period of the engine 3 is short, and the program proceeds to a step S12, wherein a temperature difference DTWTAAP between the engine coolant temperature TW and the intake air temperature TA (sensed at this start of the engine 3) is calculated (DTWTAAP←TW−TA). Further, at a step S13, an energization time correction coefficient KCTAP is retrieved from a KCTAPn table shown in FIG. 7 by using the DTWTAAP value calculated at the step S12. The energization time correction coefficient KCTAP is used for correcting a basic energization time period CTAP, as described in detail hereinafter.

Figure 9:
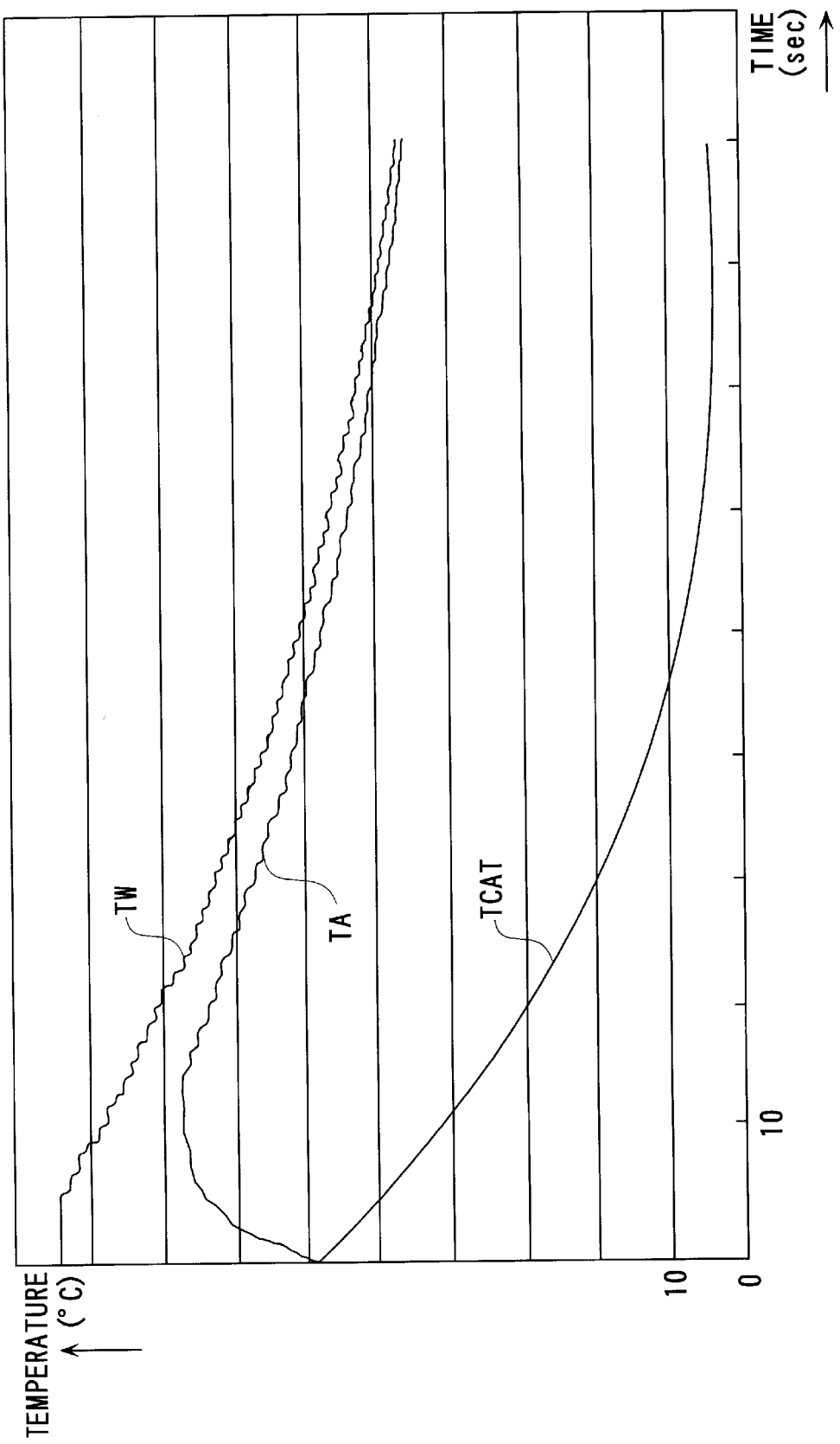
FIG. 9 is a graph showing changes in the engine coolant temperature TW, an intake air temperature TA, and a catalyst temperature TCAT which occur after the engine is sufficiently warmed up and then stopped.

Now, the reason for determining the correction coefficient KCTAP from the temperature difference DTWTAAP between the engine coolant temperature TW and the intake air temperature TA will be described with reference to FIG. 9 illustrating changes in the engine coolant temperature TW, the intake air temperature TA, and a catalyst temperature TCAT after the engine 3 is sufficiently warmed up and then stopped. As shown in the figure, when the engine 3 is stopped, the engine coolant temperature TW and the catalyst temperature TCAT fall progressively with the lapse of time in respective curves generally similar to each other. On the other hand, the intake air temperature TA rises immediately after the engine 3 is stopped and then falls in a manner getting closer to the engine coolant temperature TW. This results from the fact that the intake air temperature TA, which is held low before the stoppage of the engine 3 by fresh air continuously taken in, continues rising for some time (e.g. ten and several minutes) because the intake air staying within the intake pipe 4 after the stoppage of the engine 3 is heated by heat remaining in the engine coolant and the engine 3, and then as the engine coolant temperature TW falls with the lapse of time, the intake air temperature TA ceases to rise, and then fall, getting closer to the engine coolant temperature TW.

Therefore, as shown in the figure, the temperature difference DTWTAAP between the engine coolant temperature TW and the intake air temperature TA is large immediately after the stoppage of the engine 3, and becomes smaller as the stop time period of the engine 3 is longer. For this reason, in the KCTAPn table shown in FIG. 7, the energization time correction coefficient KCTAP is set to "0" when the temperature difference DTWTAAP is larger than 7° C. (DTWTAAP≧7° C.), i.e. when the stop time period of the engine 3 is very short, and set to a value smaller than "1.0" when the temperature difference DTWTAAP is larger than 3° C. and at the same time smaller than 7° C. (3° C.<DTWTAAP<7° C.), i.e. when the stop time period of the engine 3 is comparatively short, but the catalyst temperature TCAT has fallen to some degree. More specifically, the energization time correction coefficient KCTAP is set at a value which varies linearly between "1.0" assumed when the temperature difference DTWTAAP is 3° C. and "0" assumed when the temperature difference DTWTAAP is 7° C. Further, when the temperature difference DTWTAAP is smaller than 3° C., the intake air temperature TA is approximate to the engine coolant temperature TW, from which it can be judged that the stop time period of the engine 3 is comparatively long and that the catalyst temperature TCAT is low. Accordingly, the energization time correction coefficient KCTAP is set to "1.0" whereby the energization time period or operation time period of the air pump 12 is set to be long.

Figure 8:
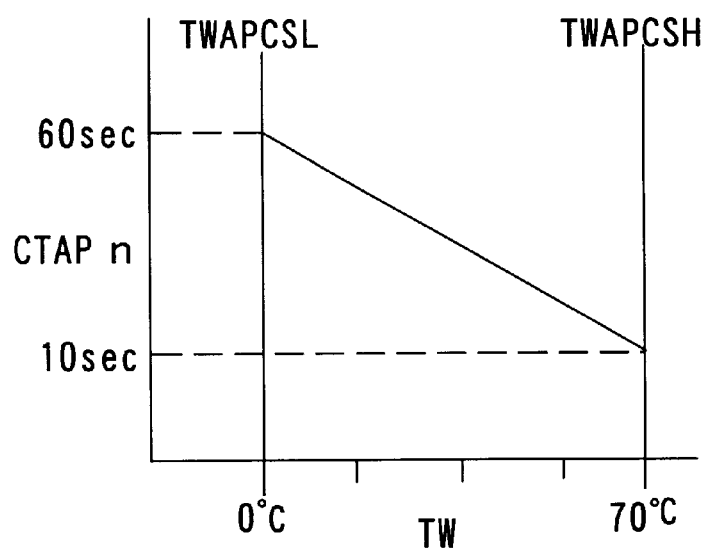
FIG. 8 is a CTAP table showing the relationship between an engine coolant temperature TW and a basic energization time period CTAP.

Then, the program proceeds to a step S15, wherein the basic energization time period CTAP is retrieved from a CTAPn table shown in FIG. 8 by using the engine coolant temperature TW sensed at the start of the engine 3. As shown in FIG. 8, the basic energization time period CTAP is set such that it gets shorter with an increase in the engine coolant temperature TW, so as to correspond to the activated state or degree of activation of the catalyst 7. More specifically, the basic energization time period CTAP is set such that it varies linearly between a minimum value (e.g. 10 sec.) assumed when the engine coolant temperature TW is equal to the upper limit value TWAPCSH (e.g. 70° C.) and a maximum value (e.g. 60 sec.) assumed when the engine coolant temperature TW is equal to the lower limit value TWAPCSL (e.g. 0° C.).

On the other hand, if the answer to the question of the step S11 is affirmative (Yes), i.e. if DTWAP<TWBU−TW holds, it is determined that the stop time period of the engine 3 is long, and the program proceeds to a step S14, wherein the energization time correction coefficient KCTAP is set to "1.0". Then, the program proceeds to the step S15, wherein the basic energization time period CTAP is retrieved as described above.

The program further proceeds to a step S16, wherein an energization time period ctAP is calculated as an operation time period obtained by correcting the basic energization time period CTAP by multiplying the same by using the energization time correction coefficient KCTAP, and then an energization time counter ctAP is set to the calculated energization time period ctAP (ctAP←CTAP×KCTAP; hereinafter the count of the energization time counter is also represented by ctAP). The energization time counter ctAP is a downcount timer.

At the following step S17, it is determined whether or not the energization time period ctAP to which the energization time counter ctAP is set is equal to or longer than a remaining time period ctAPBU which remained to be counted by the energization time counter ctAP and stored in the RAM 2b when the engine 3 was stopped last time (ctAP≧ctAPBU). If the answer to the question of the step S17 is negative (No), i.e. if the remaining time period ctAPBU is longer than the energization time period ctAP, the energization time counter ctAP is set to the remaining time period ctAPBU (ctAP←ctAPBU) at a step S18, followed by the program proceeding to a step S19. On the other hand, if the answer to the question of the step S17 is affirmative (Yes), i.e. if the energization time period ctAP is equal to or longer than the remaining time period ctAPBU, the program skips over the step S18 to the step S19. As described above, the energization time period ctAP is compared with the remaining time period ctAPBU, first, and then the energization time counter ctAP is set to a larger value (longer time period) selected between the two, to thereby energize the air pump 12 over the selected energization time period ctAP. Thus, it is possible to avoid insufficient increase in temperature of the catalyst 7 and raise the catalyst temperature to a proper temperature in a short time period.

At the step S19, it is determined whether or not the count of the energization time counter ctAP is equal to "0". If the count of the energization time counter ctAP is not equal to "0" at the step S19, i.e. if neither the energization time correction coefficient KCTAP nor the remaining time period ctAPBU is equal to "0", an energization permitting flag F_AP and an energization completion flag F_APFIN are each set to "0" at a step S20, and at the following step S21, a basic mode stabilization wait timer tmAPCSST is set to a predetermined value TMAPCSST (e.g. 2 sec.), followed by terminating the program.

The energization permitting flag F_AP is set by an energization permission-determining process for the air pump 12, which will be described in detail hereinafter. The flag F_AP is set to "1" when energization of the air pump 12 is permitted, and reset to "0" when energization of the air pump 12 is inhibited. The energization completion flag F_APFIN is a flag for indicating that energization of the air pump 12 for activation of the catalyst 7 is completed. The flag F_APFIN is set to "1" when the energization is completed, and held at "0" when the energization is not completed. Further, the basic mode stabilization wait timer tmAPCSST, which is a downcount timer, is set to a time period (predetermined time period TMAPCSST) which allows idling of the engine 3 to be fully stabilized after the start of the engine, so as to inhibit the air pump energization permission-determining process, described hereinafter, from being executed in the control process in the basic mode of the engine 3, shown in FIG. 4, before the idling of the engine 3 is stabilized.

If the answer to the question of the step S19 is affirmative (Yes), i.e. if the count of the energization time counter ctAP is equal to "0", it is judged that the air pump 12 is not required to be operated, and at the following step S22, the energization completion flag F_APFIN is set to "1", followed by terminating the program.

If at the step S10, the engine coolant temperature TW is not within the range of TWAPCSL≦TW≦TWAPCSH, which means that the engine 3 is in a high-temperature state or in a low-temperature state, it is judged that there is no need to supply secondary air to the catalyst 7, and the program proceeds to the step S22, wherein the energization completion flag F_APFIN is set to "1", followed by terminating the program.

Next, the main routine for the secondary air supply control in the basic mode of the engine 3 will be described with reference to FIG. 4. First, it is determined at a step S30 whether or not the energization completion flag F_APFIN assumes "1". If the answer to the question of the step S30 is negative (No), i.e. if the energization completion flag F_APFIN assumes "0", the program proceeds to a step S31, wherein the air pump energization permission-determining process (see FIG. 5) is executed.

Further, an air pump energization control process is executed at the following step S32, followed by terminating the program. The air pump energization control process (see FIG. 6) will also be described in detail hereinafter. On the other hand, if the answer to the question of the step S30 is affirmative (Yes), i.e. if the energization completion flag F_APFIN assumes "1", which means that the energization of the air pump 12 is completed, the program proceeds to a step S33, wherein the energization permitting flag F_AP is set to "0". Then, the air pump energization control process is executed at the step S32, followed by terminating the program.

Figure 5:
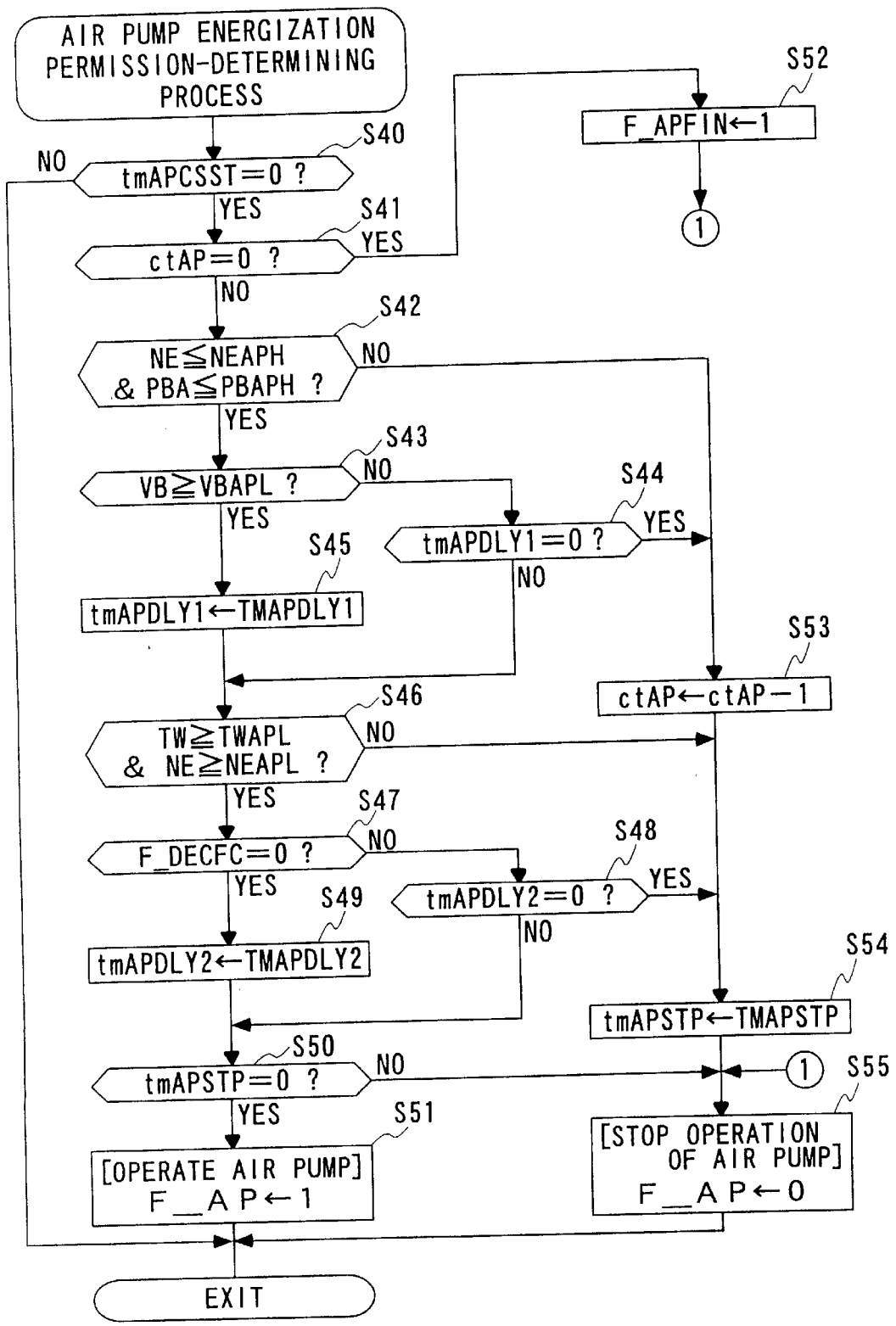
FIG. 5 is a flowchart showing a subroutine for carrying out an air pump energization permission-determining process, which is executed at a step S31 in FIG. 4.

Next, the air pump energization permission-determining process, which is executed at the step S31, will be described with reference to FIG. 5. First, it is determined at a step S40 whether or not the basic mode stabilization wait timer tmAPCSST which was set to the value TMAPCSST at the step S21 in FIG. 3 has timed out (tmAPCSST=0; hereinafter the count of the basic mode stabilization wait timer is also represented by tmAPCSST).

If the answer to the question of the step S40 is negative (No), i.e. if the basic mode stabilization wait timer tmAPCSST has not timed out (tmAPCSST≠0), the program is terminated, whereas if the answer is affirmative (Yes), i.e. if the basic mode stabilization wait timer tmAPCSST has timed out (tmAPCSST=0), the program proceeds to a step S41, wherein it is determined whether or not the count of the energization time counter ctAP is equal to "0".

If the answer to the question of the step S41 is affirmative (Yes), i.e. if the energization time counter ctAP has timed out (ctAP=0), the energization completion flag F_APFIN is set to "1" at a step S52, and then the energization permitting flag F_AP is reset to "0" at a step S55, followed by terminating the program.

On the other hand, if the answer to the question of the step S41 is negative (No), i.e. if the energization time counter ctAP has not timed out (ctAP≠0), the program proceeds to a step S42, wherein it is determined whether or not the engine rotational speed NE and the intake pipe absolute pressure PBA are equal to or lower than respective upper limit values NEAPH and PBAPH (NE≦NEAPH and PBA≦PBAPH). The upper limit values NEAPH and PBAPH are set at sufficiently high values (e.g. 4500 rpm and 550 mmHg) such that when the engine rotational speed NE and the intake pipe absolute pressure PBA exceed the respective values, the engine 3 is in a high-load operating condition and the temperature of exhaust gas is at a high temperature, whereby the catalyst 7 can be activated without any supply of secondary air.

If the answer to the question of the step S42 is negative (No), i.e. if at least one of the engine rotational speed NE and the intake pipe absolute pressure PBA is higher than a corresponding one of the upper limit values NEAPH and PBAPH, which means the engine 3 is in the high-load operating condition, the program proceeds to a step S53, wherein the count of the energization time counter ctAP is decremented by "1" (ctAP←ctAP−1). This step is carried out because activation of the catalyst 7 is expected to proceed at the same rate as it proceeds when the air pump 12 is in operation.

Then, a reenergization permitting-time stabilization wait timer tmAPSTP is set to a predetermined value TMAPSTP at a step S54, and the energization permitting flag F_AP is set to "0" at the step S55, followed by terminating the program. The reenergization permitting-time stabilization wait timer tmAPSTP is a downcount delay timer provided for preventing hunting from occurring when the air pump 12 is started again, particularly for avoiding undesired influence of a large electric current produced at the start of the air pump 12. The predetermined value TMAPSTP is set at a sufficiently large value (corresponding e.g. to 5 sec.) for preventing the hunting.

On the other hand, if the answer to the question of the step S42 is affirmative (Yes), i.e. if the engine rotational speed NE and the intake pipe absolute pressure PBA are both equal to or lower than the respective upper limit values NEAPH and PBAPH (NE≦NEAPH and PBA≦PBAPH), the program proceeds to a step S43, wherein it is determined whether or not the battery voltage VB is equal to or higher than a lower limit value VBAPL (VB≧VBAPL). The lower limit value VBAPL is set at a lowest voltage value (e.g. 10.5

V) which can allow normal operation of the solenoid 13*a* of the electromagnetic valve 13.

If the answer to the question of the step S43 is affirmative (Yes), i.e. if the battery voltage VB is equal to or higher than the lower limit value VBAPL, a first delay timer tmAPDLY1 is set to a predetermined value TMAPDLY1 at a step S45, followed by the program proceeding to a step S46. The first delay timer tmAPDLY1 is a downcount timer provided for preventing hunting from occurring due to a temporary decrease in the battery voltage VB below the lower limit value VBAPL which can be caused e.g. by driving of an accessory for an automotive vehicle on which the engine is installed, such as an air compressor, which consumes a large electric current. Therefore, the predetermined value TMAPDLY1 is set at a value (corresponding e.g. to 0.5 sec.) which makes it possible to avoid undesired influence of the large electric current and prevent the occurrence of the hunting.

If the answer to the question of the step S43 is negative (No), i.e. if the battery voltage VB is lower than the lower limit value VBAPL (VB<VBAPL), the program proceeds to a step S44, wherein it is determined whether or not the first delay timer tmAPDLY1 has timed out (tmAPDLY1=0; hereinafter the count of the first delay timer tmAPDLY1 is also represented by tmAPDLY1). If the answer to the question of the step S44 is affirmative (Yes), i.e. if the first delay timer tmAPDLY1 has timed out (tmAPDLY1=0), the steps S53 to S55 are carried out, followed by terminating the program.

If the answer to the question of the step S44 is negative (No), i.e. if the first delay timer tmAPDLY1 has not timed out (tmAPDLY1≠0), the program proceeds to the step S46, wherein it is determined whether or not the engine coolant temperature TW and the engine rotational speed NE are equal to or higher than respective lower limit values TWAPL and NEAPL (TW≧TWAPL and NE≧NEAPL). The lower limit values TWAPL and NEAPL are set to respective low values (e.g. 0° C. and 6000 rpm) such that if the engine coolant temperature TW and the engine rotational speed NE are below the respective values, there can occur an engine stall or loss of charging voltage balance of the battery voltage VB, or the catalyst 7 cannot be activated even by supply of secondary air.

If the answer to the question of the step S46 is negative (No), i.e. if at least one of the engine coolant temperature TW and the engine rotational speed NE is lower than a corresponding one of the lower limit values TWAPL and NEAPL, the steps S54 and S55 are executed, followed by terminating the program. On the other hand, if the answer to the question of the step S46 is affirmative (Yes), i.e. if the engine coolant temperature TW and the engine rotational speed NE are equal to or higher than the respective lower limit values TWAPL and NEAPL, the program proceeds to a step S47, wherein it is determined whether or not an F/C flag F_DECFC assumes "0". The F/C flag F_DECFC is a flag indicative of whether or not fuel cut is being carried out. The flag is set to "1" during a fuel cut operation, and reset to "0" when fuel cut is not being carried out. The reason for carrying out the step S47 is that fuel is not supplied to a combustion chamber during the fuel cut operation since the engine 3 is in a low-load state, and hence exhaust gases contain only a small amount of unburned combustibles, as a result of which the catalyst 7 could rather be cooled by supply of secondary air.

If the answer to the question of the step S47 is affirmative (Yes), i.e. if fuel cut is not being carried out, a second delay timer tmAPDLY2 is set to a predetermined value TMAPDLY2 at a step S49, followed by the program proceeding to a step S50. The second delay timer tmAPDLY2 is a downcount timer for preventing hunting from occurring due to changes of execution/stopping conditions of the fuel cut operation. Therefore, the predetermined value TMAPDLY2 is set at a value (e.g. 1 sec.) which makes it possible to avoid the hunting.

If the answer to the question of the step S47 is negative (No), i.e. if fuel cut is being carried, the program proceeds to a step S48, wherein it is determined whether or not the count of the second delay timer tmAPDLY2 is equal to "0". If the answer to the question of the step S48 is affirmative (Yes), i.e. if the count of the second delay timer tmAPDLY2 is equal to "0", the steps S54 and S55 are executed, followed by terminating the program. On the other hand, if the answer to the question of the step S48 is negative (No), i.e. if the count of the second delay timer tmAPDLY2 is not equal to "0", the program proceeds to the step S50, wherein it is determined whether or not the reenergization permitting-time stabilization wait timer tmAPSTP has timed out (tmAPSTP=0; hereinafter the count of the reenergization permitting-time stabilization wait timer is also represented by tmAPSTP).

If the answer to the question of the step S50 is affirmative (Yes), i.e. if the timer tmAPSTP has timed out (tmAPSTP=0), the energization permitting flag F_AP is set to "1" (F_AP←1) at a step S51, followed by terminating the program. On the other hand, if the answer is negative (No), i.e. if the timer tmAPSTP has not timed out (tmAPSTP≠0), the step S55 is executed, followed by terminating the program.

Figure 6:
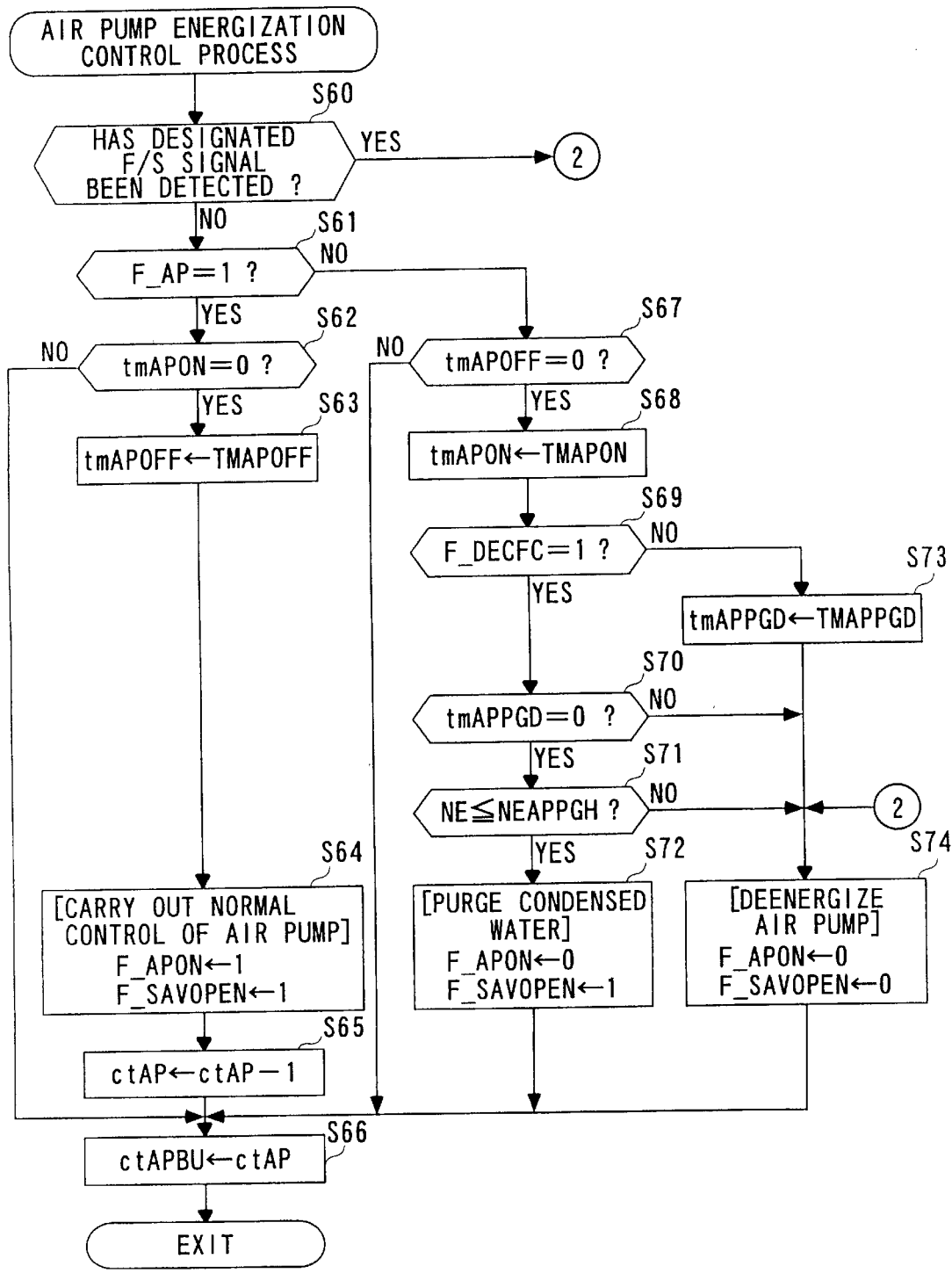
FIG. 6 is a flowchart showing a subroutine for carrying out an air pump energization control process, which is executed at a step S32 in FIG. 4.

Next, the air pump energization control process, which is executed at the step S32 in FIG. 4, will be described with reference to FIG. 6. As shown in FIG. 6, first, it is determined at a step S60 whether or not any designated fail-safe signal (designated F/S) has been sensed. As designated fail-safe signals, there are employed error signals from the ECU 2, the sensors 8*a* to 8*e*, the drive mechanisms i.e. the air pump and electromagnetic valve 12 and 13 of the secondary air supply system 10, etc.

If the answer to the question of the step S60 is affirmative (Yes), i.e. if any designated fail-safe signal has been sensed, the energization flag F_APON and a valve opening/closing flag F_SAVOPEN are each reset to "0" (F_APON←0 and F_SAVOPEN←0) at a step S74. This sets the air pump 12 to be placed in a deenergized or inoperative state, and at the same time, the electromagnetic valve 13 to be closed, whereby secondary air is inhibited from being supplied to the catalyst 7 from the secondary air supply system 10. Then, the program proceeds to a step S66, wherein the present count of the energization time counter ctAP is stored in the RAM 2*b* as the remaining time period ctAPBU of the energization time period ctAP, followed by terminating the program.

If the answer to the question of the step S60 is negative (No), i.e. if the designated fail-safe signal has not been sensed, the program proceeds to a step S61, wherein it is determined whether or not the energization permitting flag F_AP assumes "1". The flag F_AP is set in the air pump energization permission-determining process as described above with reference to FIG. 5. If the answer to the question of the step S61 is affirmative (Yes), i.e. if the energization permitting flag F_AP assumes "1", the program proceeds to a step S62, wherein it is determined whether or not an air pump operating timer tmAPON has timed out (tmAPON=0; hereinafter the count of the air pump operating timer is also represented by tmAPON). The timer tmAPON is a downcount delay timer employed for avoiding hunting of the air pump 12 which can occur when the air pump 12 is switched from its inoperative state to its operative state.

If the answer to the question of the step S62 is negative (No), i.e. if the air pump operating timer tmAPON has not timed out (tmAPON≠0), the present count of the energization time counter ctAP is stored in the RAM 2b as the remaining time period ctAPBU of the energization time period ctAP at the step S66, followed by terminating the program. On the other hand, if the answer is affirmative (Yes), i.e. if the air pump operating timer tmAPON has timed out (tmAPON=0), the program proceeds to a step S63, wherein an air pump stop timer tmAPOFF is set to a predetermined value TMAPOFF. The air pump stop timer tmAPOFF is a downcount delay timer employed for avoiding the hunting of the air pump 12 when the air pump 12 is switched from its inoperative state to its operative state. Therefore, the predetermined value TMAPOFF is set at a value (e.g. 400 msec.) which makes it possible to avoid the hunting.

Then, the program proceeds to a step S64, wherein the energization flag F_APON and the valve opening/closing flag F_SAVOPEN are each set to "1" (F_APON←1 and F_SAVOPEN←1). This sets the air pump 12 to be operated, and at the same time the electromagnetic valve 13 to be opened, thereby permitting secondary air to be supplied to the catalyst 7 from the secondary air supply system 10. The program then proceeds to a step S65, wherein the count of the energization time counter ctAP is decremented by "1" (ctAP←ctAP−1), and the step S66 is carried out, followed by terminating the program.

On the other hand, if the answer to the question of the step S61 is negative (No), i.e. if the energization permitting flag F_AP assumes "0", the program proceeds to a step S67, wherein it is determined whether or not the air pump stop timer tmAPOFF has timed out (tmAPOFF=0; hereinafter the count of the air pump stop timer is also represented by tmAPOFF). If the answer to the question of the step S67 is negative (No) (tmAPOFF≠0), the step S66 is executed, followed by terminating the program, whereas if the answer is affirmative (Yes), i.e. if the air pump stop timer tmAPOFF has timed out (tmAPOFF=0), the program proceeds to a step S68, wherein the air pump operating timer tmAPON is set to a predetermined value TMAPON. The TMAPON is set at a value (corresponding e.g. to 300 msec.) which makes it possible to avoid the hunting.

Then, the program proceeds to a step S69, wherein it is determined whether or not the F/C flag F_DECFC assumes "1". If fuel cut is not being carried out at the step S69 (F_DECFC=0), a purge timer tmAPPGD is set to a predetermined value TMAPPGD at a step S73, and further, the steps S74 and S66 are carried out, followed by terminating the program. The purge timer tmAPPGD is a downcount delay timer employed for avoiding hunting due to changes of execution/stopping of fuel-cut operation of the engine. Therefore, the predetermined value TMAPPGD is set at a value (corresponding e.g. to 1 sec.) which makes it possible to avoid the hunting.

If the answer to the question of the step S69 is affirmative (Yes), i.e. if fuel cut is being carried out, the program proceeds to a step S70, wherein it is determined whether or not the purge timer tmAPPGD has timed out (tmAPPGD=0; hereinafter the count of the purge time is also represented by tmAPPGD). If the answer to the question of the step S70 is negative (No) (tmAPPGD≠0), the steps S74 and S66 are executed, followed by terminating the program.

If the answer to the question of the step S70 is affirmative (Yes), i.e. if the purge timer tmAPPGD has timed out (tmAPPGD=0), the program proceeds to a step S71, wherein it is determined whether or not the engine rotational speed NE is equal to or lower than an upper limit value NEAPPGH (NE≦NEAPPGH). The upper limit value NEAPPGH is set at a value of the engine rotational speed NE (e.g. 400 rpm) which allows the reed valve arranged at the location downstream of the electromagnetic valve 13 to be opened by the negative pressure produced by pulsation of exhaust gases during the fuel cut operation.

If the answer to the question of the step S71 is affirmative (Yes), i.e. if the engine rotational speed NE is equal to or lower than the upper limit value NEAPPGH (NE≦NEAPPGH), the program proceeds to a step S72, wherein the energization flag F_APON is reset to "0", and the valve opening/closing flag F_SAVOPEN is set to "1". This sets the air pump to be placed in its inoperative state, but the electromagnetic valve 13 to be opened, whereby the reed valve is opened by the negative pressure caused by pulsation of exhaust gases, whereby condensed water within the secondary air supply pipe 11 is permitted to be exhausted into the exhaust pipe 6, that is, execution of purge of condensed water is set. Then, the step S66 is executed, followed by terminating the program.

On the other hand, if the answer to the question of the step S71 is negative (No), i.e. if the engine rotational speed NE exceeds the upper limit value NEAPPGH (NE>NEAPPGH), the steps S74 and S66 are executed, followed by terminating the program.

As described in detail heretofore, according to the secondary air supply control system 1 of the present embodiment, first, at the start of the engine 3 after the stoppage of the same, the temperature difference TWBU−TW between the engine coolant temperature at the stoppage of the engine and that at the start of the engine is compared with the predetermined reference value DTWAP to thereby determine whether or not the stop time period of the engine 3 is short. In this case, the engine coolant temperature TW tends to fall continuously after the engine 3 is stopped, so that it is possible to determine accurately from the temperature difference TWBU−TW whether the stop time period of the engine 3 is long or short. If the stop time period of the engine 3 is short, the energization time correction coefficient KCTAP is determined from the temperature difference DTWTAAP (TW−TA) between the engine coolant temperature TW and the intake air temperature TA both sensed at the start of the engine 3, and then the basic energization time period CTAP determined from the engine coolant temperature TW is multiplied by the energization time correction coefficient KCTAP, whereby the basic energization time period CTAP is corrected, i.e. the energization time period ctAP is calculated. As described above, when the stop time period of the engine 3 is short, the temperature difference DTWTAAP (=TW−TA) accurately reflects the stop time period of the engine 3 and hence a decrease in temperature of the catalyst 7. Therefore, differently from the prior art in which the time period for supplying secondary air is determined simply based on the engine coolant temperature at the start of the engine, the present embodiment makes it possible to supply an appropriate amount of secondary air to the catalyst 7 according to the decrease in temperature of the catalyst 7 by correcting the basic energization time period CTAP based on the temperature difference TW−TA (by calculating the energization time period ctAP), thereby activating the catalyst 7 properly. Further, it is possible to obtain the above advantageous effect without sensing the catalyst temperature directly, so that a sensor for use in sensing the catalyst temperature can be dispensed with, which prevents an increase in manufacturing costs.

Moreover, according to the embodiment, the remaining time period ctAPBU of the energization time period ctAP is stored in the RAM 2b when the engine is stopped, and at the start of the engine after the stoppage of the same, a longer time period is selected between the energization time period ctAP at the start of the engine and the stored remaining time period ctAPBU so as to supply secondary air to the catalyst 7. Thus, the air pump 12 can be operated over the energization time period ctAP determined at the start of the engine after the stoppage of the same, which makes it possible to prevent occurrence of insufficient supply of secondary air and activate the catalyst 7 positively and sufficiently.

Although in the above embodiment, the temperature difference TWBU−TW between the engine coolant temperature at the stoppage of the engine and that at the start of the engine is compared with the predetermined reference value DTWAP to thereby determine whether or not the stop time period of the engine 3 is short, this is not limitative, but the determination may be carried out in any other method utilizing the temperature difference TWBU−TW. Further, in the above embodiment, the energization time correction coefficient KCTAP is retrieved from the KCTAPn table by using the temperature difference DTWTAAP (=TW−TA) between the engine coolant temperature TW at the start of the engine 3 and the intake air temperature TA, and then the basic energization time period CTAP is multiplied by the energization time correction coefficient KCTAP, to thereby obtain the energization time period ctAP. However, this is not limitative, but the calculation of the energization time period ctAP, i.e. the correction of the basic energization time period CTAP may be carried out by any other method so long as it uses the temperature difference DTWTAAP alone or in combination with or other operational parameters besides the temperature difference DTWTAAP.

It is further understood by those skilled in the art that the foregoing is a preferred embodiment of the invention, and that various changes and modifications may be made without departing from the spirit and scope thereof.

What is claimed is:

1. A secondary air supply control system for an internal combustion engine including an exhaust passage, and a catalyst arranged in said exhaust passage, for purification of exhaust gases, the secondary air supply control system controlling supply of air to said catalyst, and comprising:

air supply means for supplying air to said catalyst;

engine coolant temperature-sensing means for sensing a temperature of an engine coolant within said engine;

intake air temperature-sensing means for sensing a temperature of intake air within said engine;

operation time-determining means for determining an operation time period over which said air supply means is to be operated;

storage means for storing therein a value of said temperature of said engine coolant sensed by said engine coolant temperature-sensing means at a stoppage of said engine;

arithmetic operation means for calculating a temperature difference between said value of said temperature of said engine coolant sensed at said stoppage of said engine and stored in said storage means and a value of said temperature of said engine coolant sensed at a start of said engine after said stoppage of said engine;

determination means for determining whether or not a stop time period between said stoppage of said engine and said start of said engine is short, depending on said temperature difference calculated by said arithmetic operation means; and operation time-correcting means for correcting said operation time period, based on a temperature difference between said value of said temperature of said engine coolant sensed at said start of said engine and a value of said temperature of said intake air sensed at said start of said engine, when said determination means determines that said stop time period is short.

2. A secondary air supply control system according to claim 1, further comprising:

remaining time storage means for storing therein a remaining time period of said operation time period at said stoppage of said engine;

comparison means for performing a comparison between said operation time period determined at said start of said engine and said remaining time period stored in said remaining time storage means; and selection means for selecting, based on a result of said comparison performed by said comparison means, a longer one of said operation time period determined at said start of said engine and said remaining time period, as said operation time period at said start of said engine over which said air supply means is to be operated.

3. A secondary air supply control system according to claim 2, wherein said operation time-correcting means corrects said operation time period such that as said temperature difference between said value of said temperature of said engine coolant sensed at said start of said engine and said value of said temperature of said intake air sensed at said start of said engine is larger, said operation time period becomes shorter.

4. A secondary air supply control system according to claim 2, wherein said determination means determines that said stop time period between said stoppage of said engine and said start of said engine is short, when said temperature difference calculated by said arithmetic operation means is not larger than a predetermined value.

5. A secondary air supply control system according to claim 2, wherein said operation time-determining means determines said operation time period based on said value of said temperature of said engine coolant sensed at said start of said engine.

6. A secondary air supply control system according to claim 1, wherein said operation time-correcting means corrects said operation time period such that as said temperature difference between said value of said temperature of said engine coolant sensed at said start of said engine and said value of said temperature of said intake air sensed at said start of said engine is larger, said operation time period becomes shorter.

7. A secondary air supply control system according to claim 1, wherein said determination means determines that said stop time period between said stoppage of said engine and said start of said engine is short, when said temperature difference calculated by said arithmetic operation means is not larger than a predetermined value.

8. A secondary air supply control system according to claim 1, wherein said operation time-determining means determines said operation time period based on said value of said temperature of said engine coolant sensed at said start of said engine.

* * * * *